(12) United States Patent (10) Patent No.: US 12,663,500 B2
Lee et al. (45) Date of Patent: Jun. 23, 2026

(54) UNDERWATER DRIFT TRACKING SYSTEM BASED ON MARITIME POSITIONING PLATFORM

(71) Applicant: KOREA INSTITUTE OF OCEAN SCIENCE & TECHNOLOGY, Busan (KR)

(72) Inventors: Moonjin Lee, Daejeon (KR); Tae Sung Kim, Daejeon (KR); Yong Myung Kim, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 96 days.

(21) Appl. No.: 18/680,215

(22) Filed: May 31, 2024

(65) Prior Publication Data

US 2024/0319317 A1 Sep. 26, 2024

Related U.S. Application Data

(63) Continuation of application No. PCT/KR2023/003778, filed on Mar. 22, 2023.

(30) Foreign Application Priority Data

Mar. 25, 2022 (KR) ......................... 10-2022-0037559

(51) Int. Cl.
*G01S 5/18* (2006.01)
*B63B 22/18* (2006.01)
(Continued)

(52) U.S. Cl.
CPC ................ *G01S 5/18* (2013.01); *B63B 22/18* (2013.01); *B63B 22/26* (2013.01); *B63B 27/36* (2013.01);
(Continued)

(58) Field of Classification Search
CPC ...... G01S 5/18; G01S 5/0072; G01S 2205/04; G01S 5/0036; G01S 11/14; G01S 19/01;
(Continued)

(56) References Cited

U.S. PATENT DOCUMENTS 5,140,922 A * 8/1992 Bowman ................... B63C 1/02
114/45
2012/0158303 A1* 6/2012 Kato ...................... G01C 13/00
702/3

FOREIGN PATENT DOCUMENTS

JP H0955707 A * 2/1997
KR 10-0989193 B1 10/2010
(Continued)

OTHER PUBLICATIONS

English Translation of JP-H0955707-A Seino Kazuya (Year: 1997).*
(Continued)

*Primary Examiner* — Kito R Robinson
*Assistant Examiner* — Kevin Jerome Harvey, II
(74) *Attorney, Agent, or Firm* — Knobbe, Martens, Olson & Bear, LLP

(57) ABSTRACT

Proposed is an underwater drift tracking system based on a maritime positioning platform. The underwater drift tracking system may include a plurality of underwater drifting objects configured to transmit sound wave signals including their own water depth information by using sound wave communication while drifting underwater. The underwater drift tracking system may also include a maritime drift tracker configured to track real-time underwater locations of the underwater drifting objects by moving on the sea under its own power, receiving the transmitted sound wave signals from the plurality of underwater drifting objects, and cal-
(Continued)

culating absolute location information of the plurality of underwater drifting objects using the received sound wave signals.

5 Claims, 3 Drawing Sheets

(51) Int. Cl.

| | | |
|---|---|---|
| *B63B 22/26* | (2006.01) | |
| *B63B 27/36* | (2006.01) | |
| *B63B 35/00* | (2020.01) | |
| *B63G 8/00* | (2006.01) | |
| *B63G 8/14* | (2006.01) | |
| *B63G 8/22* | (2006.01) | |
| *G01S 5/00* | (2006.01) | |
| *G01S 11/14* | (2006.01) | |
| *G01S 19/01* | (2010.01) | |
| *B63B 22/00* | (2006.01) | |

(52) U.S. Cl.
CPC .............. *B63B 35/00* (2013.01); *B63G 8/001* (2013.01); *B63G 8/14* (2013.01); *B63G 8/22* (2013.01); *G01S 5/0036* (2013.01); *G01S 5/0072* (2013.01); *G01S 11/14* (2013.01); *G01S 19/01* (2013.01); *B63B 2022/006* (2013.01); *B63B 2035/006* (2013.01); *B63B 2035/008* (2013.01); *B63B 2201/18* (2013.01); *B63B 2211/02* (2013.01); *B63B 2213/02* (2013.01); *B63G 2008/002* (2013.01); *G01S 2205/04* (2020.05)

(58) Field of Classification Search
CPC . B63G 8/001; B63G 8/14; B63G 8/22; B63G 2008/002; B63B 27/36; B63B 2022/006; B63B 35/00; B63B 2035/006; B63B 2035/008; B63B 2201/18; B63B 2211/02; B63B 2213/02; B63B 22/18; B63B 22/26
See application file for complete search history.

(56) References Cited

FOREIGN PATENT DOCUMENTS

| | | | | |
|---|---|---|---|---|
| KR | 10-2013-0088256 A | 8/2013 | | |
| KR | 10-2063255 B1 | 1/2020 | | |
| KR | 102218582 B1 * | 2/2021 | ............. | G01C 21/08 |
| KR | 10-2021-0104250 A | 8/2021 | | |
| KR | 102334171 B1 * | 12/2021 | ............. | B63B 27/36 |

OTHER PUBLICATIONS

English Translation of KR-102218582-B1 Park Sung Joon (Year: 2021).*
English Translation of KR-102334171-B1 Lee Moon Jin (Year: 2021).*
International Search Report and Written Opinion mailed Jun. 26, 2023 in International Application No. PCT/KR2023/003778, in 10 pages. English translation of ISR).

* cited by examiner

| Maritime drift tracker | |
|---|---|
| Power source unit | ~210 |
| Propulsion unit | ~220 |
| Launching unit | ~230 |
| Communication unit | ~240 |
| GPS reception unit | ~250 |
| Sound wave tracking unit | ~260 |
| Control unit | ~270 |

UNDERWATER DRIFT TRACKING SYSTEM BASED ON MARITIME POSITIONING PLATFORM

CROSS-REFERENCE TO RELATED APPLICATIONS

This application is a continuation application, and claims the benefit under 35 U.S.C. § 120 and § 365 of PCT Application No. PCT/KR2023/003778, filed on Mar. 22, 2023, which claims priority to Korean Patent Application No. 10-2022-0037559 filed on Mar. 25, 2022, each of which are hereby incorporated by reference in their entirety.

BACKGROUND

Technical Field

The present disclosure relates to an underwater drift tracking system based on a maritime positioning platform.

Description of Related Technology

In recent years, the advancement of marine technology has led to an increase in maritime work such as marine ecosystem surveys and undersea base construction. Not only this increase in maritime work but also the continued increase in maritime trade has resulted in a continuous increase in maritime accidents such as ship sinkings and oil spills.

SUMMARY

One aspect is an underwater drift tracking system based on a maritime positioning platform that tracks the drift of a plurality of underwater drifting objects in order to simulate the movement and dispersion of underwater pollutants.

Another aspect is an underwater drift tracking system based on a maritime positioning platform is disclosed.

Another aspect is an underwater drift tracking system based on a maritime positioning platform that includes a plurality of underwater drifting objects configured to transmit sound wave signals including their own water depth information by using sound wave communication while drifting underwater, and a maritime drift tracker configured to track real-time underwater locations of the underwater drifting objects by moving on the sea under its own power, receiving the transmitted sound wave signals from the plurality of underwater drifting objects, and calculating absolute location information of the plurality of underwater drifting objects using the received sound wave signals.

The plurality of underwater drifting objects includes a power source unit, a water depth sensor unit configured to measure a water depth, and a sound wave transmission unit configured to transmit a sound wave signal including information on the water depth and voltage of the power source unit.

The maritime drift tracker includes a propulsion unit configured to generate a propulsive force, a launching unit provided with a storage unit in which a spare underwater drifting object is stored and configured to launch the spare underwater drifting object into water, a communication unit configured to perform communication with external devices via a maritime communication network, a GPS reception unit configured to receive GPS signals and generate absolute location information of the maritime drift tracker, a sound wave tracking unit installed at a lower part of the maritime drift tracker and configured to receive the transmitted sound wave signals, and a control unit configured to calculate the absolute location information of the plurality of underwater drifting objects by using the absolute location information of the maritime drift tracker, the sound wave signals, and the water depth.

The control unit checks voltage information included in the received sound wave signals, and controls the launching unit to launch the spare underwater drifting object into the water from the storage unit if a checked voltage of an underwater drifting object is less than or equal to a preset minimum voltage value.

The spare underwater drifting object is provided with a buoyancy tank for adjusting buoyancy, and the control unit controls the launching unit to inject water into the buoyancy tank so that the spare underwater drifting object has a buoyancy that causes the spare underwater drifting object to be located in a preset water depth section.

The control unit measures a level of the received sound wave signal, and controls the propulsion unit to generate a propulsive force to cause the maritime drift tracker to move to a preset proximity distance region of an underwater drifting object if the measured level is less than or equal to a preset minimum level.

The control unit calculates the absolute location information of the plurality of underwater drifting objects using a mathematical expression below:

$$x' = x + \Delta x$$
$$y' = y + \Delta y$$
$$z' = \Delta z,$$

where (x', y', z') are absolute location coordinates of the underwater drifting object, (x, y, z) are absolute location coordinates of the maritime drift tracker, $\Delta x$ and $\Delta y$ are distances between the maritime drift tracker and the underwater drifting object on the x-axis and y-axis, respectively, and $\Delta z$ is a water depth of the underwater drifting object.

The control unit calculates the absolute location coordinates of the plurality of underwater drifting objects using a mathematical expression below:

$$\Delta x = L_H \cos \theta$$
$$\Delta y = L_H \sin \theta$$
$$L_z^2 = L_H^2 + \Delta z^2$$
$$L_H = \sqrt{L_z^2 - \Delta z^2},$$

where $L_Z$ is a straight line distance from the maritime drift tracker to the underwater drifting object, $\theta$ is a direction angle of the underwater drifting object relative to a location of the maritime drift tracker, and $L_H$ is a horizontal distance from the maritime drift tracker to the underwater drifting object.

The underwater drift tracking system based on a maritime positioning platform in accordance with the embodiments of the present disclosure can simulate the movement and dispersion of underwater pollutants by tracking the drift of a plurality of underwater drifting objects.

DETAILED DESCRIPTION

When a maritime accident occurs, it is necessary to make a rapid response such as saving lives and preventing the accident from spreading. A significant portion of the rescue and search conducted to quickly respond to maritime accidents that have occurred is done manually, and the difficulty for workers can be said to be quite high due to the harsh marine environment. In particular, ocean currents change their nature due to a variety of factors, and workers must carry out their work while overcoming these ever-changing ocean currents.

Therefore, it is necessary to provide accurate information on ocean currents to ensure that work in the ocean is safe, quick, and efficient.

Singular expressions as used herein include plural expressions unless the context clearly dictates otherwise. As used herein, terms such as "comprise" or "include" should not be construed as necessarily including all of the various components or steps described herein, but should be construed in such a way that some of the components or steps may not be included or additional components or steps may further be included. In addition, terms such as " . . . unit" and "module" described herein refer to a unit that processes at least one function or operation, and may be implemented in hardware or software, or in a combination of hardware and software.

Hereinafter, various embodiments of the present disclosure will be described in detail with reference to the accompanying drawings.

Figure 1:
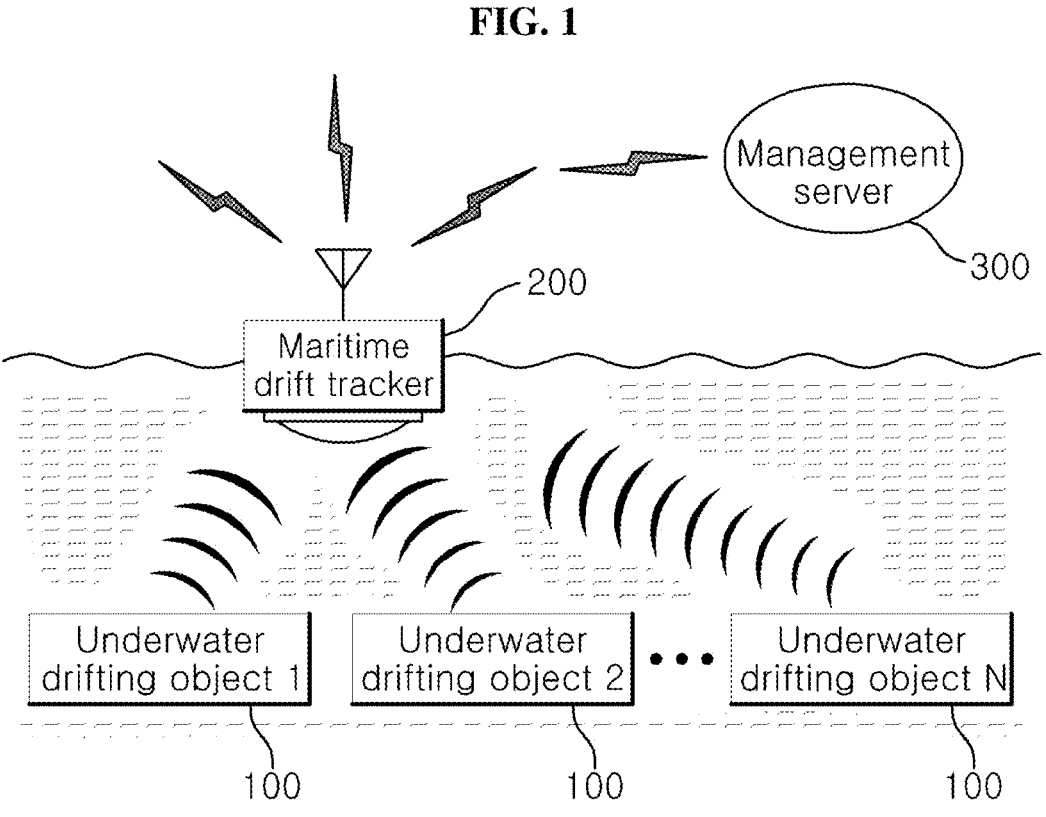
FIG. 1 is a diagram schematically illustrating the configuration of an underwater drift tracking system based on a maritime positioning platform in accordance with an embodiment of the present disclosure.
Figure 2:
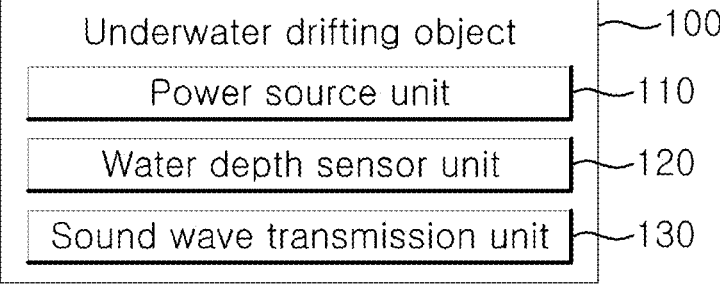
FIG. 2 is a diagram schematically illustrating the configuration of an underwater drifting object in accordance with an embodiment of the present disclosure.
Figure 3:
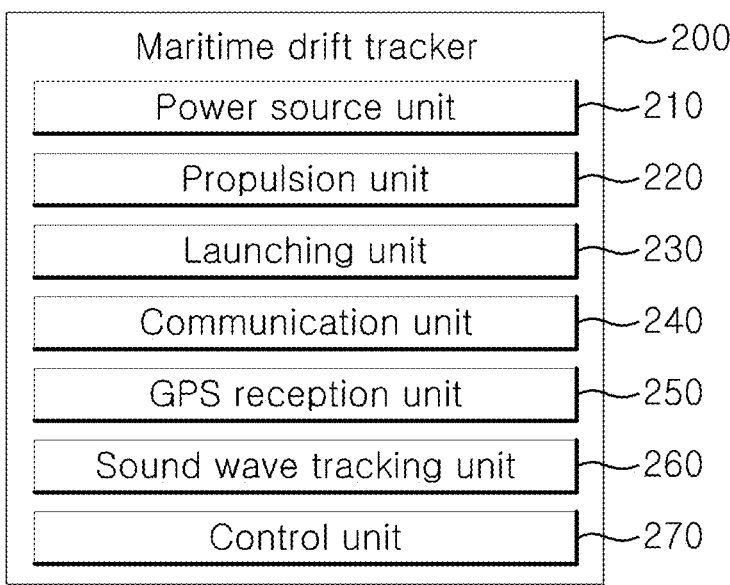
FIG. 3 is a diagram schematically illustrating the configuration of a maritime drift tracker in accordance with an embodiment of the present disclosure.
Figure 4:
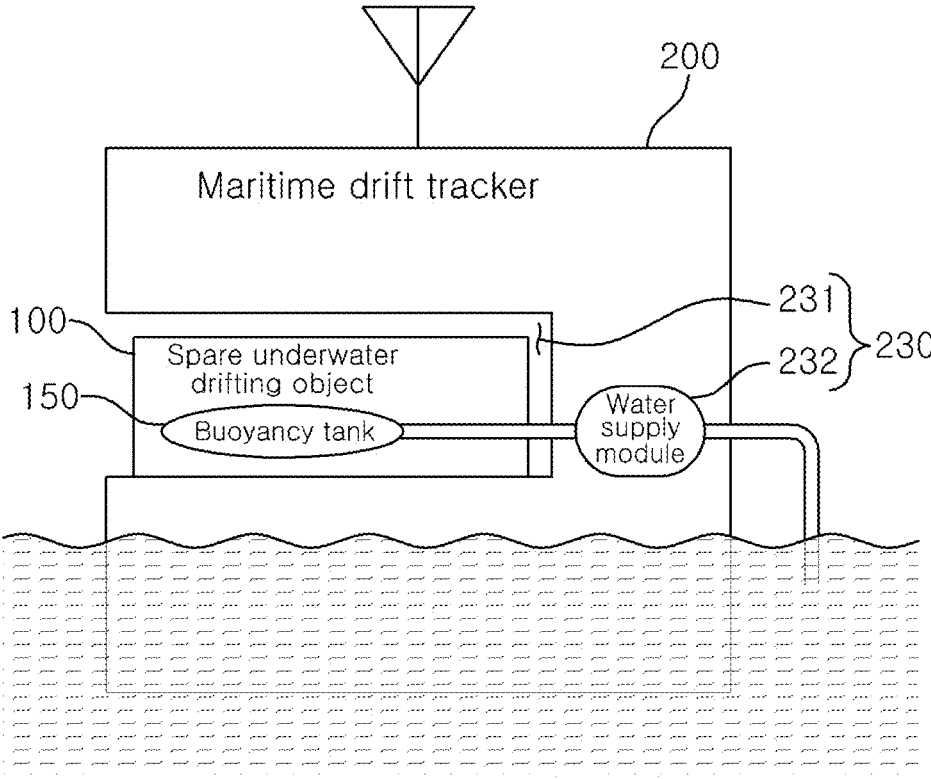
FIGS. 4 to 6 are diagrams for describing the operation of an underwater drift tracking system based on a maritime positioning platform in accordance with an embodiment of the present disclosure.
Figure 5:
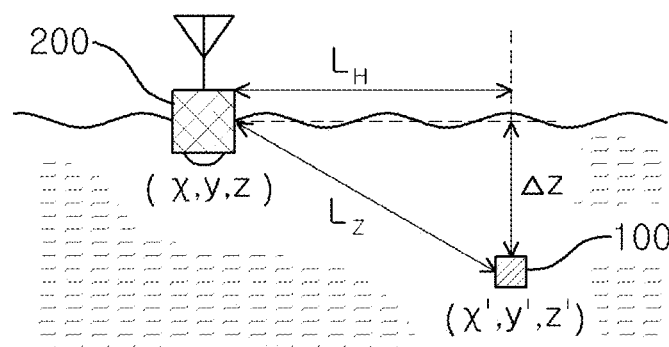
Figure 6:
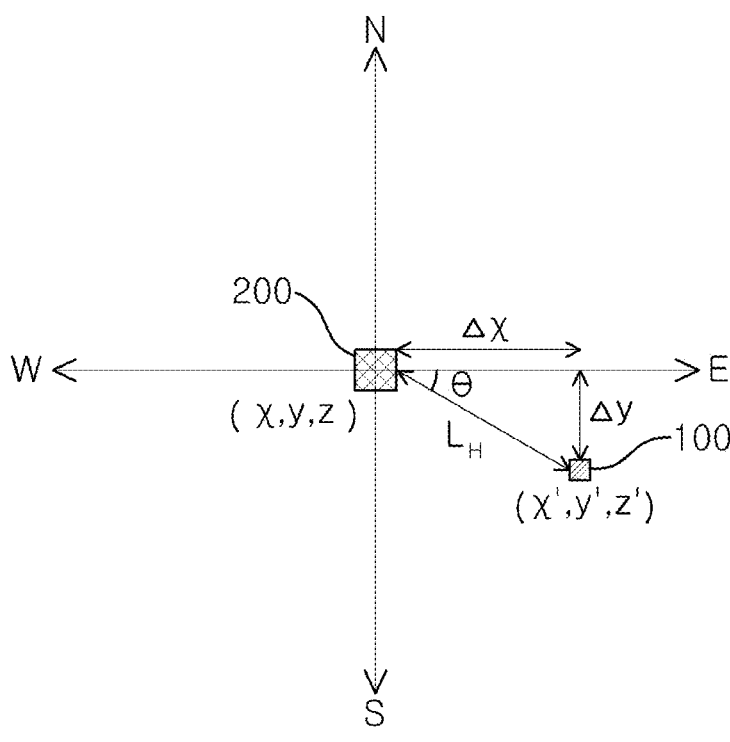

FIG. 1 is a diagram schematically illustrating the configuration of an underwater drift tracking system based on a maritime positioning platform in accordance with an embodiment of the present disclosure, FIG. 2 is a diagram schematically illustrating the configuration of an underwater drifting object in accordance with an embodiment of the present disclosure, FIG. 3 is a diagram schematically illustrating the configuration of a maritime drift tracker in accordance with an embodiment of the present disclosure, and FIGS. 4 to 6 are diagrams for describing the operation of an underwater drift tracking system based on a maritime positioning platform in accordance with an embodiment of the present disclosure. In the following, an underwater drift tracking system based on a maritime positioning platform in accordance with an embodiment of the present disclosure will be described focusing on FIG. 1, but FIGS. 2 to 6 will be referred to as well.

Referring to FIG. 1, an underwater drift tracking system based on a maritime positioning platform in accordance with an embodiment of the present disclosure may be configured by including a plurality of underwater drifting objects 100, a maritime drift tracker 200, and a management server 300.

The plurality of underwater drifting objects 100 is an object that drifts underwater according to the flow of water in a submerged state. For example, the underwater drifting objects 100 may have a buoyancy that is set for them to move according to ocean currents in a preset water depth section. To this end, the underwater drifting objects 100 may be provided with a buoyancy tank to adjust buoyancy. In other words, water may be injected into the buoyancy tanks so that the underwater drifting objects 100 have a buoyancy that causes them to be located in a preset water depth section.

Further, the plurality of underwater drifting objects 100 transmits sound wave signals including their own water depth information by using sound wave communication while drifting in the water.

In other words, referring to FIG. 2, the underwater drifting object 100 may be configured by including a power source unit (or a power source) 110, a water depth sensor unit (or a water depth sensor) 120, and a sound wave transmission unit (or a sound wave transmitter) 130.

The power source unit 110 supplies electric power to drive the underwater drifting object 100. For example, the power source unit 110 may be configured by including a lightweight battery.

The water depth sensor unit 120 measures the water depth at which the underwater drifting object 100 is located in the water. For example, the water depth sensor unit 120 may measure water pressure and convert the measured water pressure into water depth by using a preset algorithm.

The sound wave transmission unit 130 transmits a sound wave signal including preset information for sound wave communication. In other words, the sound wave transmission unit 130 may transmit a sound wave signal including water depth information of the underwater drifting object 100 measured by the water depth sensor unit 120. In addition, the sound wave transmission unit 130 may transmit a sound wave signal including the measured voltage information of the power source unit 110. To this end, the power source unit 110 may be provided with a voltage sensor (not shown) that measures the internal voltage.

The maritime drift tracker 200 moves on the sea under its own power and performs sound wave communication with the plurality of underwater drifting objects 100 drifting in the water.

In other words, the maritime drift tracker 200 may receive sound wave signals from the plurality of underwater drifting objects 100 drifting in the water, and calculate the absolute location information of the plurality of underwater drifting objects 100 by using the received sound wave signals, thereby tracking the real-time underwater location of each underwater drifting object 100.

In other words, referring to FIG. 3, the maritime drift tracker 200 may be configured by including a power source unit 210, a propulsion unit (or a propulsion circuit) 220, a launching unit (or a launching circuit) 230, a communication unit (or a communication circuit) 240, a GPS reception unit (or a GPS receiver) 250, a sound wave tracking unit (or a sound wave tracker) 260, and a control unit (or a controller) 270.

The power source unit 210 supplies electric power to drive the maritime drift tracker 210. For example, the power source unit 210 may be configured by including a lightweight battery.

The propulsion unit 220 is a self-powered unit for moving the maritime drift tracker 200 on the sea, and is installed at the lower part of the maritime drift tracker 200 and generates a propulsive force.

For example, if the level of a sound wave signal transmitted by the underwater drifting object 100 that is in sound wave communication with the maritime drift tracker 200 drops to a preset minimum level or lower, the propulsion unit 220 may generate a propulsive force under the control of the control unit 270 so that the maritime drift tracker 200 moves to a preset proximity distance region of the corresponding underwater drifting object 100.

The launching unit 230 is provided with a storage unit 231 in which a spare underwater drifting object 100 is stored, as shown in FIG. 4, and conducts the role of launching the spare underwater drifting object 100 stored in the storage unit 231 into the water under the control of the control unit 270. Further, the launching unit 230 may be provided with a water supply module 232 for injecting water into a buoyancy tank 150 of the spare underwater drifting object 100 stored in the storage unit 231. In other words, before the spare underwater drifting object 100 is launched into the water, water may be injected into the buoyancy tank 150 so that the spare underwater drifting object 100 has a buoyancy that causes it to be located in a preset water depth section. Here, the water supply module 232 may be configured by including a pump (not shown) that draws up seawater to be supplied to the buoyancy tank 150.

For example, if the voltage of the underwater drifting object 100 that is in sound wave communication with the maritime drift tracker 200 drops to a preset minimum voltage value or lower, the launching unit 230 may launch the spare underwater drifting object 100 into the water from the storage unit 231 under the control of the control unit 270.

The communication unit 240 performs communication with external devices via a maritime communication network such as LTE-Maritime.

For example, the communication unit 240 may perform communication with a management server 300 that manages the plurality of underwater drifting objects 100 and the maritime drift tracker 200, as shown in FIG. 1. Here, the communication unit 240 may transmit real-time location information of the plurality of underwater drifting objects 100 to the management server 300. Then, the management server 300 may collect in real time the location information of the plurality of underwater drifting objects 100 received from the communication unit 240, and simulate the movement and dispersion of underwater pollutants by using the collected real-time location information.

The GPS reception unit 250 receives GPS signals from a plurality of GPS satellites and generates absolute location information of the maritime drift tracker 200.

The sound wave tracking unit 260 is installed at the lower part of the maritime drift tracker 200 and receives sound wave signals transmitted by the plurality of underwater drifting objects 100. In other words, the sound wave tracking unit 260 may receive sound wave signals including water depth information and voltage information of the underwater drifting objects 100, which are transmitted from the sound wave transmission units 130 of the underwater drifting objects 100.

The control unit 270 typically controls the overall operation of the maritime drift tracker 200.

In other words, the control unit 270 may check the voltage information included in the sound wave signal received from the underwater drifting object 100, and control the launching unit 230 to launch the spare underwater drifting object 100 into the water from the storage unit 231 if the checked voltage of the underwater drifting object 100 is less than or equal to the preset minimum voltage value.

At this time, the control unit 270 may control the launching unit 230 to launch the spare underwater drifting object 100 into the water from the storage unit 231 after injecting water into the buoyancy tank 150 of the spare underwater drifting object 100 by using the water supply module 232, so that the spare underwater drifting object 100 has a buoyancy that causes it to be located in a preset water depth section.

Further, the control unit 270 may measure the level (e.g., received signal strength) of the sound wave signal received from the underwater drifting object 100, and control the propulsion unit 220 to generate a propulsive force to cause the maritime drift tracker 200 to move to a preset proximity distance region of the corresponding underwater drifting object 100 if the measured level is less than or equal to the preset minimum level.

In particular, the control unit 270 calculates the absolute location information of the plurality of underwater drifting objects 100 by using the sound wave signals including water depth information of the underwater drifting objects 100.

In other words, the control unit 270 may calculate distance information and direction information for the underwater drifting object 100 that has transmitted the corresponding sound wave signal through reception of the sound wave signal, and calculate the absolute location information of the corresponding underwater drifting object 100 by using the water depth information of the corresponding underwater drifting object 100 included in the sound wave signal, along with the calculated distance information and direction information.

In the following, a method of calculating absolute location information of an underwater drifting object 100 will be described with reference to FIGS. 5 and 6.

As shown in FIGS. 5 and 6, assuming that the absolute location coordinates of the maritime drift tracker 200 generated by the GPS reception unit 250 are (x, y, z) and the absolute location coordinates of the underwater drifting object 100 are (x', y', z'), the absolute location of the underwater drifting object 100 can be represented by the following mathematical expression.

$$x' = x + \Delta x \qquad \text{[Equation 1]}$$
$$y' = y + \Delta y$$
$$z' = \Delta z,$$

Here, $\Delta x$ and $\Delta y$ are the distances between the maritime drift tracker 200 and the underwater drifting object 100 on the x-axis and y-axis, respectively, and $\Delta z$ is the water depth of the underwater drifting object 100.

Further, the distance information and direction information of the underwater drifting object 100 calculated through reception of the sound wave signal can be represented by a straight line distance $L_Z$ from the maritime drift tracker 200 to the underwater drifting object 100 and a direction angle $\theta$ of the underwater drifting object 100 relative to the location of the maritime drift tracker 200, respectively, as shown in FIGS. 5 and 6.

Referring to FIG. 5, the horizontal distance $L_H$ from the maritime drift tracker 200 to the underwater drifting object 100 can be calculated by the following mathematical expression.

$$L_z^2 = L_H^2 + \Delta z^2 \qquad \text{[Equation 2]}$$

$$L_H = \sqrt{L_z^2 - \Delta z^2},$$

Therefore, referring to FIG. 6, the absolute location of the underwater drifting object 100 can be calculated by the following mathematical expression.

$$\Delta x = L_H \cos \theta \qquad \text{[Equation 3]}$$

$$\Delta y = L_H \sin \theta$$

$$x' = x + \left( \sqrt{L_z^2 - \Delta z^2} \cos \theta \right)$$

$$y' = y + \left( \sqrt{L_z^2 - \Delta z^2} \sin \theta \right)$$

$$z' = \Delta z$$

On the other hand, the components of the embodiments described above can be readily understood from a process perspective. In other words, each component can be understood as each process. Further, the processes of the embodiments described above can be readily understood from the perspective of the components of the device.

Moreover, the technical content described above may be implemented in the form of program instructions that can be executed via various computer means and recorded on a computer-readable medium. The computer-readable medium may include program instructions, data files, data structures, and the like, alone or in combination. The program instructions recorded on the medium may be those specially designed and configured for the embodiments or may be those known and available to persons skilled in the art of computer software. Examples of the computer-readable recording media include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, etc. Examples of the program instructions include not only machine language code, such as that created by a compiler, but also high-level language code that can be executed by a computer using an interpreter or the like. The hardware devices may be configured to operate as one or more software modules, and vice versa, to perform the operations of the embodiments.

The embodiments of the present disclosure described above have been disclosed for purposes of illustration, those skilled in the art who have common knowledge of the present disclosure will be able to make various modifications, changes, and additions within the spirit and scope of the present disclosure, and such modifications, changes, and additions should be considered as falling within the scope of the patent claims below.

What is claimed:

1. An underwater drift tracking system based on a maritime positioning platform, comprising:

a plurality of underwater drifting objects configured to transmit sound wave signals including their own water depth information by using sound wave communication while drifting underwater; and a maritime drift tracker configured to track real-time underwater locations of the underwater drifting objects by moving on the sea under its own power, receiving the transmitted sound wave signals from the plurality of underwater drifting objects, and calculating absolute location information of the plurality of underwater drifting objects using the received sound wave signals, wherein each of the plurality of underwater drifting objects comprises:

a power source;

a water depth sensor configured to measure a water depth; and a sound wave transmitter configured to transmit a sound wave signal including information on the water depth and voltage of the power source, wherein the maritime drift tracker comprises:

a propulsion circuit configured to generate a propulsive force;

a launching circuit comprising a storage configured to store a spare underwater drifting object and configured to launch the spare underwater drifting object into water;

a communication circuit configured to perform communication with external devices via a maritime communication network;

a GPS receiver configured to receive GPS signals and generate absolute location information of the maritime drift tracker;

a sound wave tracker installed at a lower part of the maritime drift tracker and configured to receive the transmitted sound wave signals; and a controller configured to calculate the absolute location information of the plurality of underwater drifting objects by using the absolute location information of the maritime drift tracker, the sound wave signals, and the water depth, and wherein the controller is configured to calculate the absolute location information of each of the plurality of underwater drifting objects using mathematical expressions below:

$$x' = x + \Delta x$$

$$y' = y + \Delta y$$

$$z' = \Delta z,$$

where (x', y', z') are absolute location coordinates of the underwater drifting object, (x, y, z) are absolute location coordinates of the maritime drift tracker, $\Delta x$ and $\Delta y$ are distances between the maritime drift tracker and the underwater drifting object on the x-axis and y-axis, respectively, and $\Delta z$ is a water depth of the underwater drifting object.

2. The underwater drift tracking system based on a maritime positioning platform of claim 1, wherein the controller is configured to:

check voltage information included in the received sound wave signals, and control the launching circuit to launch the spare underwater drifting object into the water from the storage in response to a checked voltage of an underwater drifting object being less than or equal to a preset minimum voltage value.

3. The underwater drift tracking system based on a maritime positioning platform of claim 2, wherein the spare underwater drifting object comprises a buoyancy tank configured to adjust buoyancy, and wherein the controller is configured to control the launching circuit to inject water into the buoyancy tank so that the spare underwater drifting object has a buoyancy that causes the spare underwater drifting object to be located in a preset water depth section.

4. The underwater drift tracking system based on a maritime positioning platform of claim 1, wherein the controller is configured to measure a level of the received sound wave signal from one of the plurality of underwater drifting objects, and control the propulsion circuit to generate a propulsive force to cause the maritime drift tracker to move to a preset proximity distance region of the one of the plurality of underwater drifting objects in response to the measured level being less than or equal to a preset minimum level.

5. The underwater drift tracking system based on a maritime positioning platform of claim 1, wherein the controller is configured to calculate the absolute location coordinates of each of the plurality of underwater drifting objects using mathematical expressions below:

$$\Delta x = L_H \cos \theta$$

$$\Delta y = L_H \sin \theta$$

$$L_z^2 = L_H^2 + \Delta z^2$$

$$L_H = \sqrt{L_z^2 - \Delta z^2},$$

where $L_Z$ is a straight line distance from the maritime drift tracker to the underwater drifting object, $\theta$ is a direction angle of the underwater drifting object relative to a location of the maritime drift tracker, and $L_H$ is a horizontal distance from the maritime drift tracker to the underwater drifting object.

* * * * *